(12) United States Patent
Bauer, Jr. et al.

(10) Patent No.: US 7,545,629 B1
(45) Date of Patent: Jun. 9, 2009

(54) METHODS AND SYSTEMS FOR ASSEMBLY OF A DISPLAY

(75) Inventors: John Albert Bauer, Jr., Round Rock, TX (US); Jeremy Osborne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 12/018,797

(22) Filed: Jan. 23, 2008

(51) Int. Cl.
*H05K 7/00* (2006.01)
*G02F 1/1333* (2006.01)
*A47G 1/06* (2006.01)

(52) U.S. Cl. ............... 361/679.27; 349/58; 361/679.29; 40/781

(58) Field of Classification Search ............... 361/681, 361/683, 724–727, 679.24; 312/223.1, 223.2, 312/265.6; 248/917–924; 349/57–60; 345/173, 345/905, 169; 40/706, 712, 24, 729–731, 40/779, 781–785
See application file for complete search history.

(56) References Cited

U.S. PATENT DOCUMENTS

| 5,379,182 | A  | * | 1/1995  | Fujimori et al. ............. 361/681 |
| 6,151,207 | A  | * | 11/2000 | Kim ........................... 361/681 |
| 7,126,651 | B2 | * | 10/2006 | Kim et al. ..................... 349/58 |
| 2002/0080297 | A1 | * | 6/2002  | Sung ........................... 349/58 |
| 2004/0125549 | A1 |   | 7/2004  | Iredale |
| 2006/0060732 | A1 |   | 3/2006  | Tannas, Jr. |
| 2007/0253150 | A1 |   | 11/2007 | Yue et al. |

* cited by examiner

*Primary Examiner*—Jayprakash N Gandhi
*Assistant Examiner*—Nidhi Desai
(74) *Attorney, Agent, or Firm*—Pramudji Wendt & Tran, LLP (57) ABSTRACT

A method for assembling a display for an information handling system (IHS) including the steps of providing a bracket on a display wherein the bracket has at least two guides. The display is positioned in proximity to a back cover, wherein a first guide is aligned with a first receiving portion of the back cover. A front cover is positioned in proximity to the display, wherein a second receiving portion of the front cover is aligned with a second guide. A first fastener is actuated causing the first guide to engage the first receiving portion and the second guide to engage the second receiving portion.

19 Claims, 7 Drawing Sheets

METHODS AND SYSTEMS FOR ASSEMBLY OF A DISPLAY

BACKGROUND

1. Technical Field

The present disclosure relates generally to the field of information handling systems. More specifically, but without limitation, the present disclosure relates to assembling a display.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many information handling systems (IHSs), a display may be secured to bezel and back cover by utilizing a bracket and multiple fasteners. For example, some displays may have a bracket secured to it using several screws. The bracket may also be secured to a back cover using multiple screws, and a bezel may be secured to the display and back cover using additional screws. The use of multiple screws during the assembly of an IHS display may increase assembly time and cost. Furthermore, consumers may find that the visible screws or the plastic covers used to hide the screws are not aesthetically pleasing.

Thus a need remains for methods and systems for reducing the number of fasteners needed to assemble a display for an IHS.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for assembling a display for an information handling system (IHS). The method includes providing a bracket on a display, wherein the bracket comprises at least two guides. The method also includes positioning the display in proximity to a back cover, wherein a first guide is aligned with a first receiving portion of the back cover, and positioning a front cover in proximity to the display, wherein a second receiving portion of the front cover is aligned with a second guide. The method also includes actuating a first fastener, wherein the first fastener causes the first guide to engage the first receiving portion and the second guide to engage the second receiving portion.

Another aspect of the disclosure provides an information handling system (IHS) including a bracket defining a slot, wherein a first fastener attaches the bracket to a display through the slot. The bracket may includes a first set of guides that engage a first set of receiving portions of a back cover, and a second set of guides that engage a second set of receiving portions of a front cover.

Yet another aspect of the disclosure provides an information handling system (IHS) including a display and a bracket defining a slot. The bracket may include a first guide and a second guide, wherein a first fastener attaches the bracket to the display through the slot. The IHS may also include a back cover with a first receiving portion engaging the first guide, and a front cover with a second receiving portion engaging the second guide. The IHS may also include a second fastener that causes the first guide to slide into the first receiving portion and the second guide to slide into the second receiving portion.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Although the invention as been described with reference to specific implementations, it will be understood by those skilled in the art that various changes may be made without departing from the spirit or scope of the invention. Various examples of such changes have been given in the forgoing description. Accordingly, the disclosure of implementations of the disclosure is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations.

For simplicity and clarity of illustration, the drawing and/or figures illustrate the general manner of construction, and descriptions and details of well known features and techniques may be omitted to avoid unnecessarily obscuring the disclosure.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
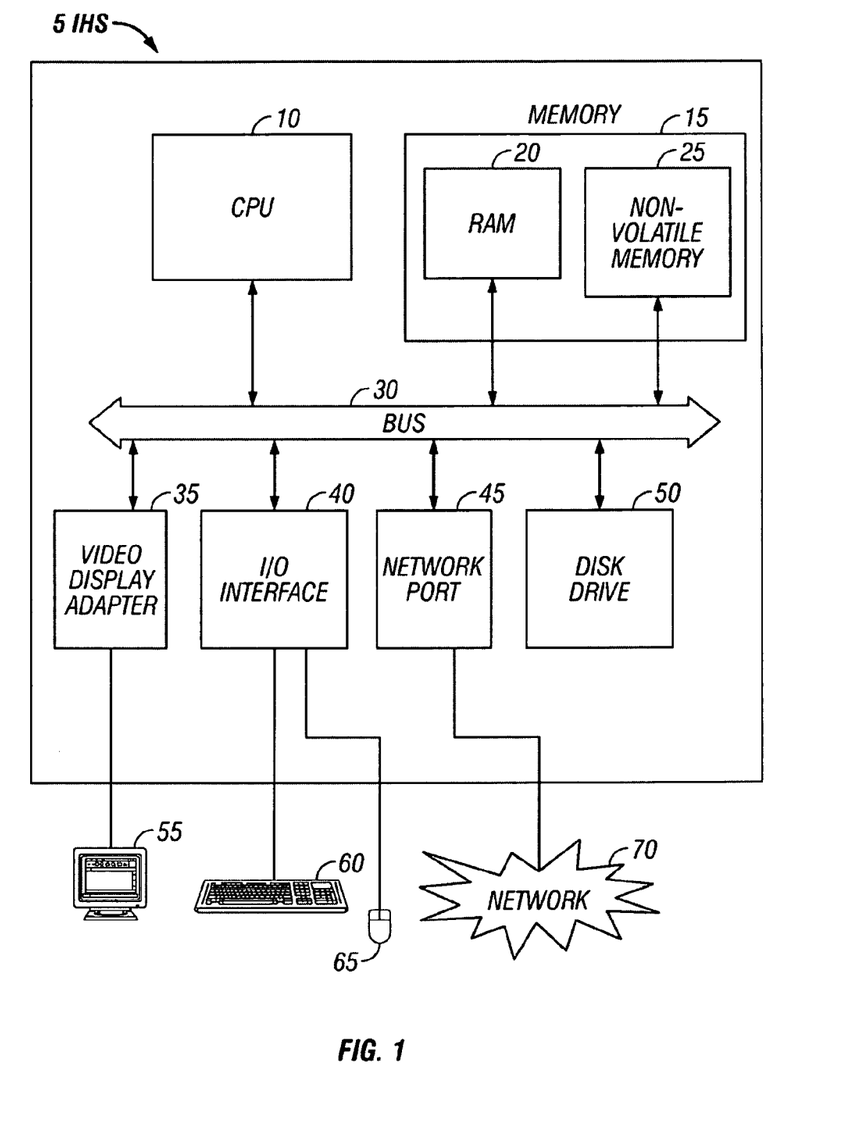
FIG. 1 shows a schematic of an information handling system according to the present disclosure.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
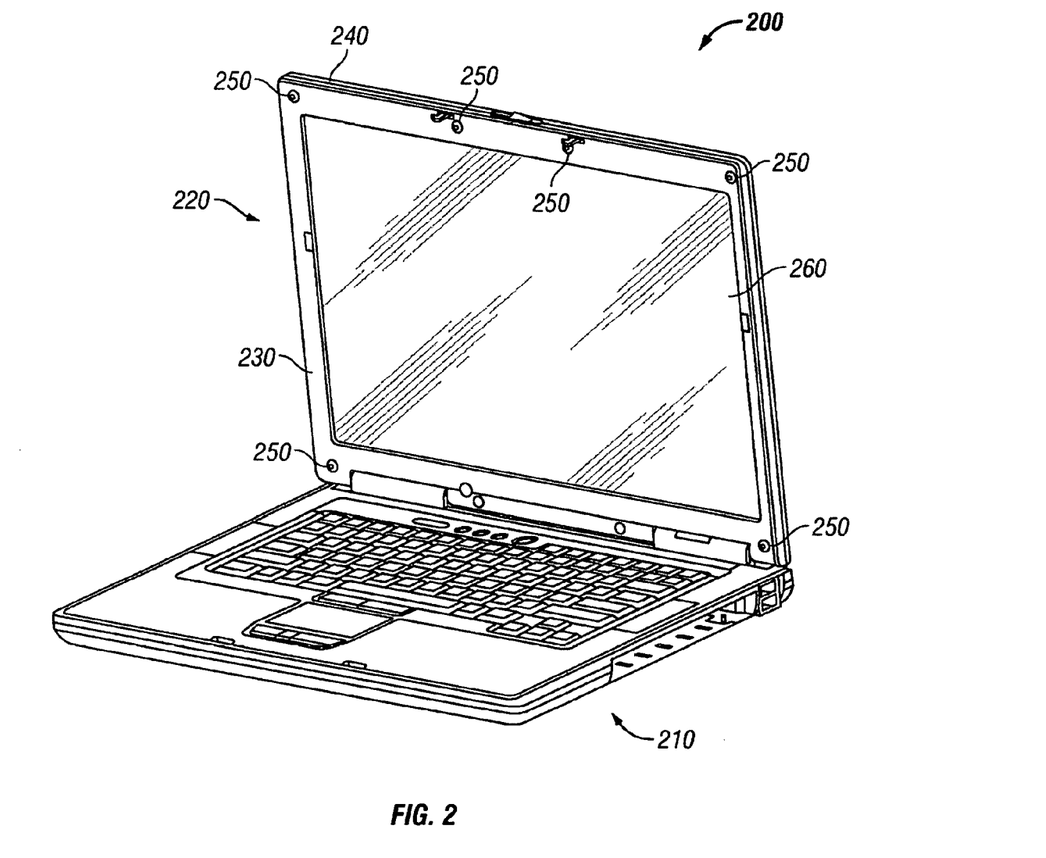
FIG. 2 illustrates one possible implementation of a portable IHS.

FIG. 2 illustrates one possible implementation of a portable IHS, shown as a laptop 200 or notebook computer. As described herein, the terms laptop and notebook computer are used synonymously. Other implementations of a portable IHS include, but are not limited to, a personal computer, palmtop PC, MP3 player, handheld device, cell phone, personal digital assistant (PDA), digital camera, foldable electronic device or the like. The laptop 200 may include a base 210 and a display assembly 220. As used herein, a display assembly 220 may also be referred to as a display housing or a display.

A display assembly 220 may include a bezel 230, a back cover 240, a plurality of fasteners 250, and a display 260. A bezel 230 and back cover 240 may be provided to secure a display 260. A bezel 230 may surround the edge of a display 260 to provide protection, while still providing an opening to allow the display 260 to be viewed. A bezel 230 and back cover 240 may be made using plastic, metal, or any suitable material including a combination of materials. As used herein in the present disclosure, a bezel 230 may be referred to as a front cover or the like. Several fasteners 250, such as screws or the like, may be used to secure a bezel 230 to a back cover 240. By securing a bezel 230 to a back cover 240, a display 260 is also secured in place. A display 260 may be provided utilizing a liquid crystal display (LCD), a plasma display, or any other suitable display. Further, several fastener covers (not shown) or the like may be used to hide fasteners 250 and make a display assembly 220 more aesthetically pleasing. A display assembly 220 may also include speakers (not shown) or other additional elements. In another implementation, a display 260 may be secured by an adhesive or the like.

Figure 3:
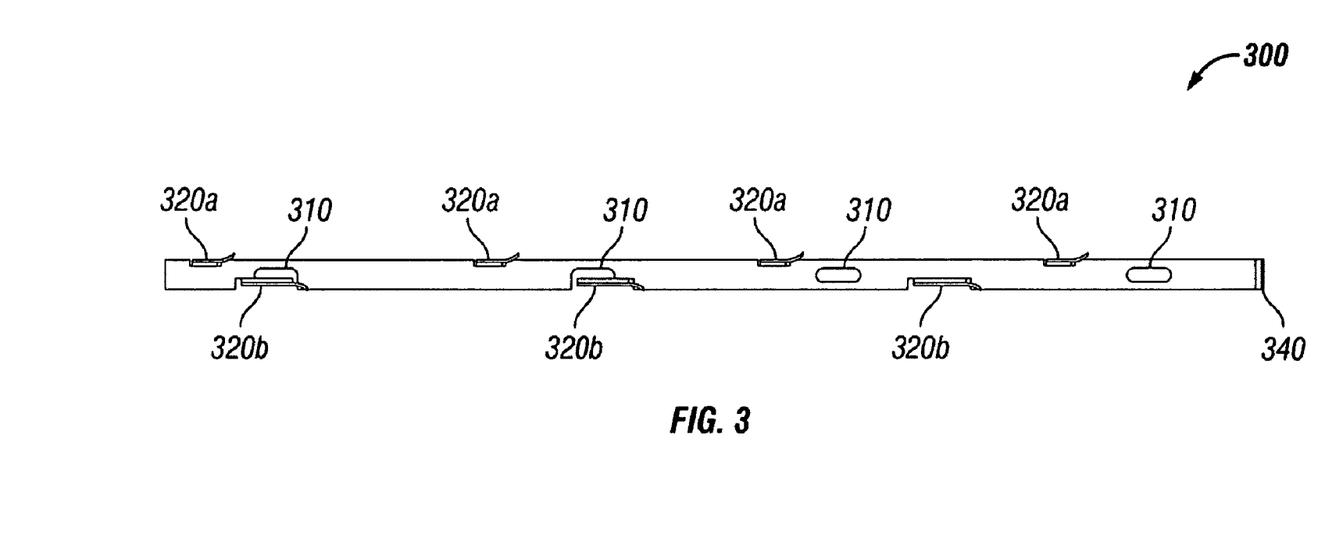
FIG. 3 provides an illustrative implementation of a bracket on a display of an IHS.

FIG. 3 provides an illustrative implementation of a bracket on a display of an IHS. A bracket 300 may be utilized to secure a display of an IHS to a back cover and/or a bezel. As used herein, a bezel may also be referred to as a front cover or the like. A bracket 300 may have one or more slots 310 that provide an opening to secure the bracket to a display utilizing a fastener. A slot 310 is shaped in a manner that offers enough space for fastener to fit through, while still offering a limited range of motion. For example, a slot 310 may have a somewhat elliptical shape that allows a bracket 200 to move side-to-side in the horizontal direction (in the orientation shown) when a fastener is placed through the slot 210. However, the slots 310 may not allow a bracket 300 to move vertically up-and-down or away from the display (not shown). It should be noted that the range of motion discussed above applies to FIG. 3. Any other orientations shown in the other figures may not provide for the same range of motion described above.

Figure 4A:
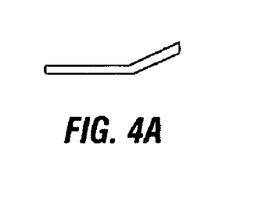
FIG. 4A represents an illustrative implementation of a guide.
Figure 4B:
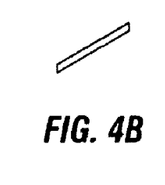
FIG. 4B represents another illustrative implementation of a guide.

Additionally, a bracket may have a first set of one or more guides 320a. A guide 320a may be a portion of a bracket 300 shaped to secure a cover to a display. As shown in FIG. 3, a portion of a guide 320a is parallel to a longest portion of a bracket, but one end of the guide 320a may be curved slightly upward. In another implementation, a guide 320a may include a sharp angle or corner as represented in the illustrative implementation in FIG. 4A. In yet another implementation, a guide 320a may be substantially straight, with minimal or no curvature. For example, the shape of a guide 320a may be a straight line angled slightly up or down and not parallel to a longest portion of a bracket as represented in the illustrative implementation shown in FIG. 4B. It is clear to one of ordinary skill of the art, that a guide, as used herein, may be implemented utilizing any suitable shape which may provide the functionality as described above. The present disclosure is in no way limited to implementing the specific shapes described herein. A bracket may also have a second set of one or more angled members or guides 320b. While the second set of guides 320b shown in FIG. 3 curve slightly downward, any suitable shape may implemented as discussed previously regarding the first set of guides 320a. A first and second set of guides 320a, 320b may be utilized to secure a back or front cover, which will be discussed in detail below. A bracket 300 may also have a tab 340 utilized for firmly securing a bezel and a back cover to a display, which will also be discussed in detail below. A tab 340 may extend from a bracket 300 to allow contact with a fastener (not shown). A tab 340 may also have an opening or the like for the fastener such as a screw hole or the like. A bracket 300 may allow assembly of display with a minimal use of fasteners. A bracket 300 may provide for quicker, faster, and cheaper assembly of a display, while reducing potential damage to a display during assembly.

Figure 5:
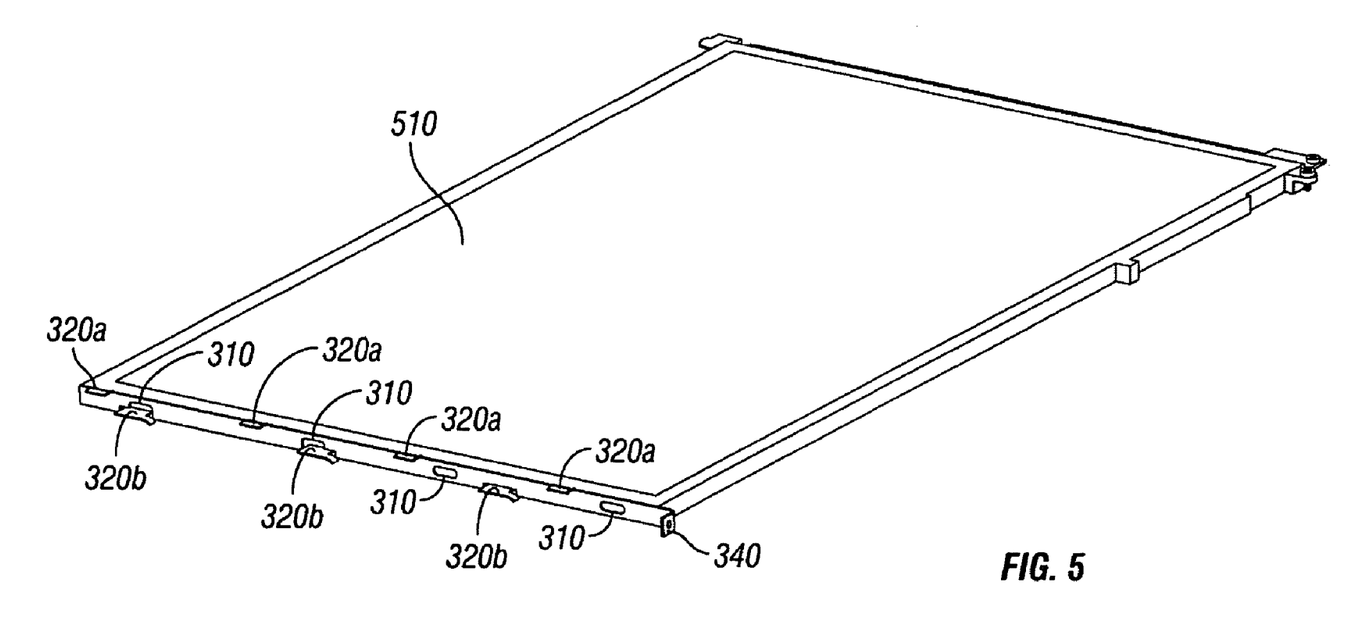
FIG. 5 provides an illustrative implementation of a bracket attached to a display.

FIG. 5 provides an illustrative implementation of a bracket attached to a display. A bracket 300 may be attached to a display 510 by one or more slot fasteners 520. Slot fasteners 520 may be any suitable type of fastener including, but not limited to, a screw, a bolt, a fastener with or without threads, or any other suitable fastener. Additionally, a slot fastener 520 may be made of any suitable material such as metal, plastic, rubber, or the like. As discussed previously, slot fasteners 520 may attach a bracket 300 to a display 510 through slots 310. Slots 310 may be shaped to allow a bracket 300 to slide back-and-forth on fasteners 520 in a direction parallel to a viewing plane of a display 510. In other words, a bracket 300 may only have one degree of freedom along the side of a display 510. Slots 310 and slot fasteners 520 may not provide a bracket 300 with any other degrees of freedom. For example, bracket 300 may not move away or towards the side of a display 510 and up or down in a direction perpendicular to a viewing plane of a display 510.

Figure 6:
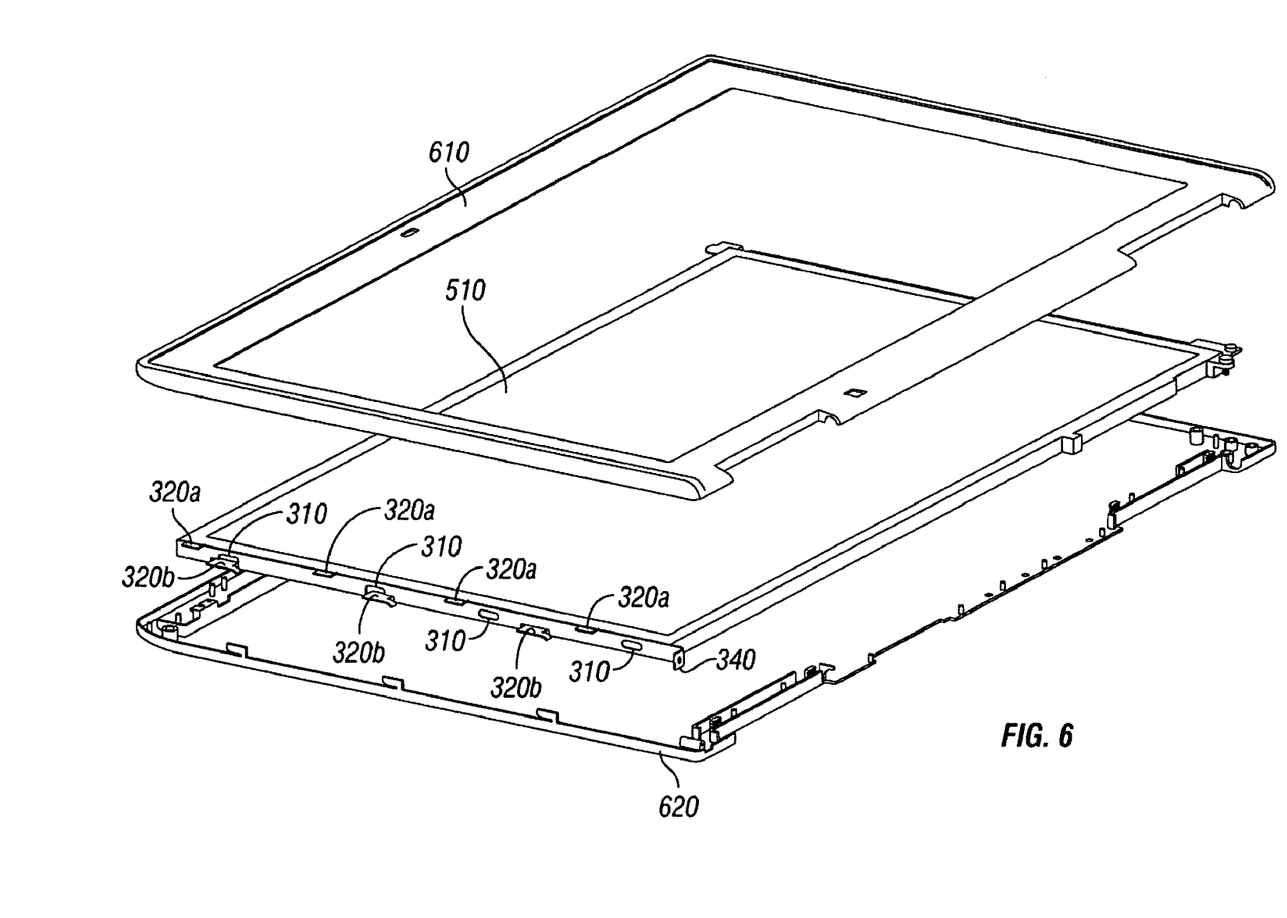
FIG. 6 represents an exploded view of an illustrative implementation of a display assembly.

FIG. 6 represents an exploded view of an illustrative implementation of a display assembly. A display assembly may have a bezel 610, a display 510 with attached brackets 300, a back cover 620, as well as other components not shown for brevity. A bezel 610 may have an opening for a viewable portion of a display 510. A back cover 620 may not have an opening unlike a bezel 610. A back cover 620 may provide protection for a display 510 from impact damage, scratching, and/or the like. A bezel 610 and back cover 620 may be made of plastic, metal, or any other suitable material.

Figure 7A:
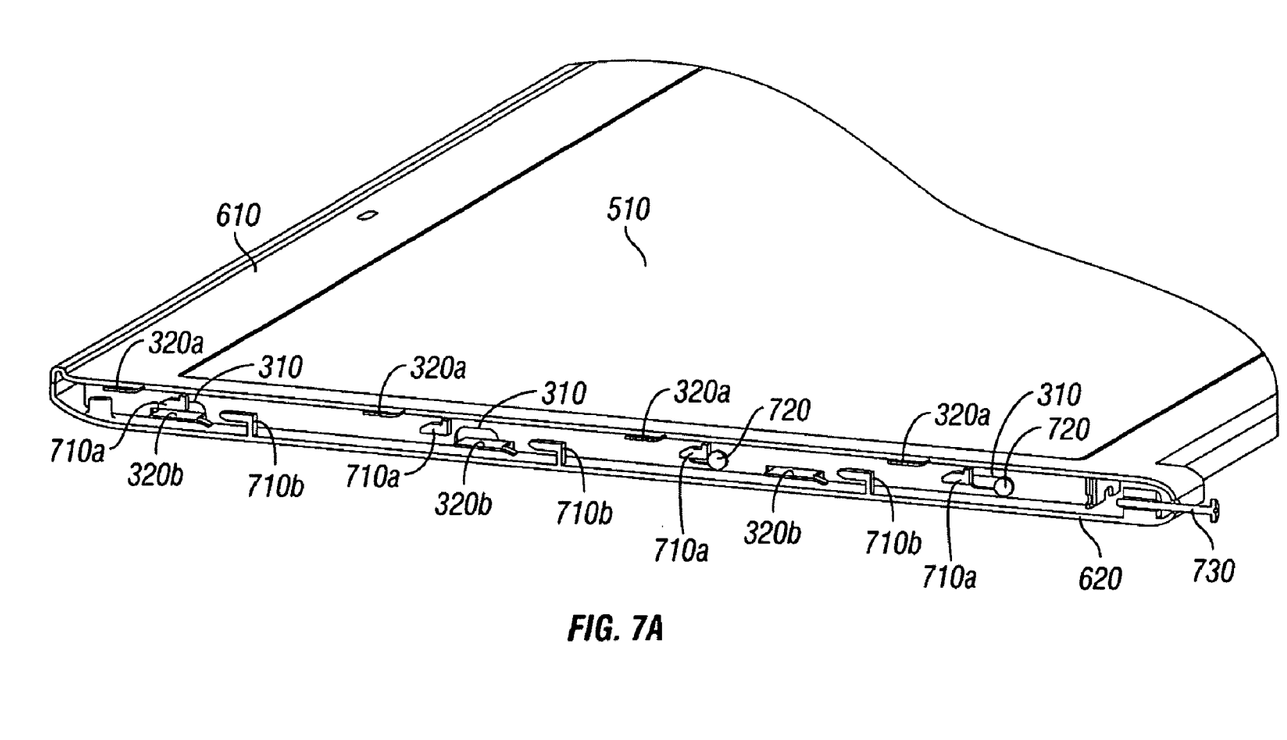
FIG. 7A provides a cut away view of an illustrative implementation a display assembly.

FIG. 7A provides a cut away view of an illustrative implementation of a display assembly. The cut away view provides a view of a bezel 610, a display 510 with an attached bracket 300, and a back cover 620 just prior to completing assembly of a display housing or assembly 700. A bezel 610 may have one or more receiving portions 710*a* which may align with a first set of guides 320*a* on a bracket 300. A back cover 620 may have one or more receiving portions 710*b* which may align with a second set of guides 320*b* on a bracket 300. Receiving portions 710*a*, 710*b* may define an area for guides 320*a*, 320*b* to engage with during assembly. A bezel 610 and a back cover 620 may be in proximity to a display 510 and bracket 300 just prior to assembly. For example, a guide 320*a* may be slightly above a bottom edge of a receiving portion 710*a*, and a guide 320*b* may be slightly below a top edge of a receiving portion 710*b*. In the implementation shown in FIG. 7A, as guides 320*a*, 320*b* slide into receiving portions 710*a*, 710*b*, a bezel 610 may slide slightly downward to the left onto a display 510 and a back cover 620 may slide slightly upward to the left onto the back of display 510. In alternative implementations, depending on the shape and orientation of the guides and slots, a bezel and back cover may move in different directions than described regarding FIG. 7A. A back cover 620 may have an opening for a housing fastener 730. When a housing fastener 730 is actuated, the housing fastener 730 may secure in a fastener opening of a tab 340 causing guides 320*a*, 320*b* to slide into receiving portions 710*a*, 710*b*. A housing fastener 730 may also prevent guides 320*a*, 320*b* from sliding out of receiving portions 710*a*, 710*b*. A housing fastener 730 may be actuated by a turning motion, snapped into place by an applied force, or any other suitable method. As discussed regarding slot fasteners 520, housing fastener 730 may be any suitable type of fastener as well. Further, housing fastener 730 may be made of any suitable material as well. In another implementation, a bezel 610 may additionally or alternatively have an opening for a housing fastener 730.

Figure 7B:
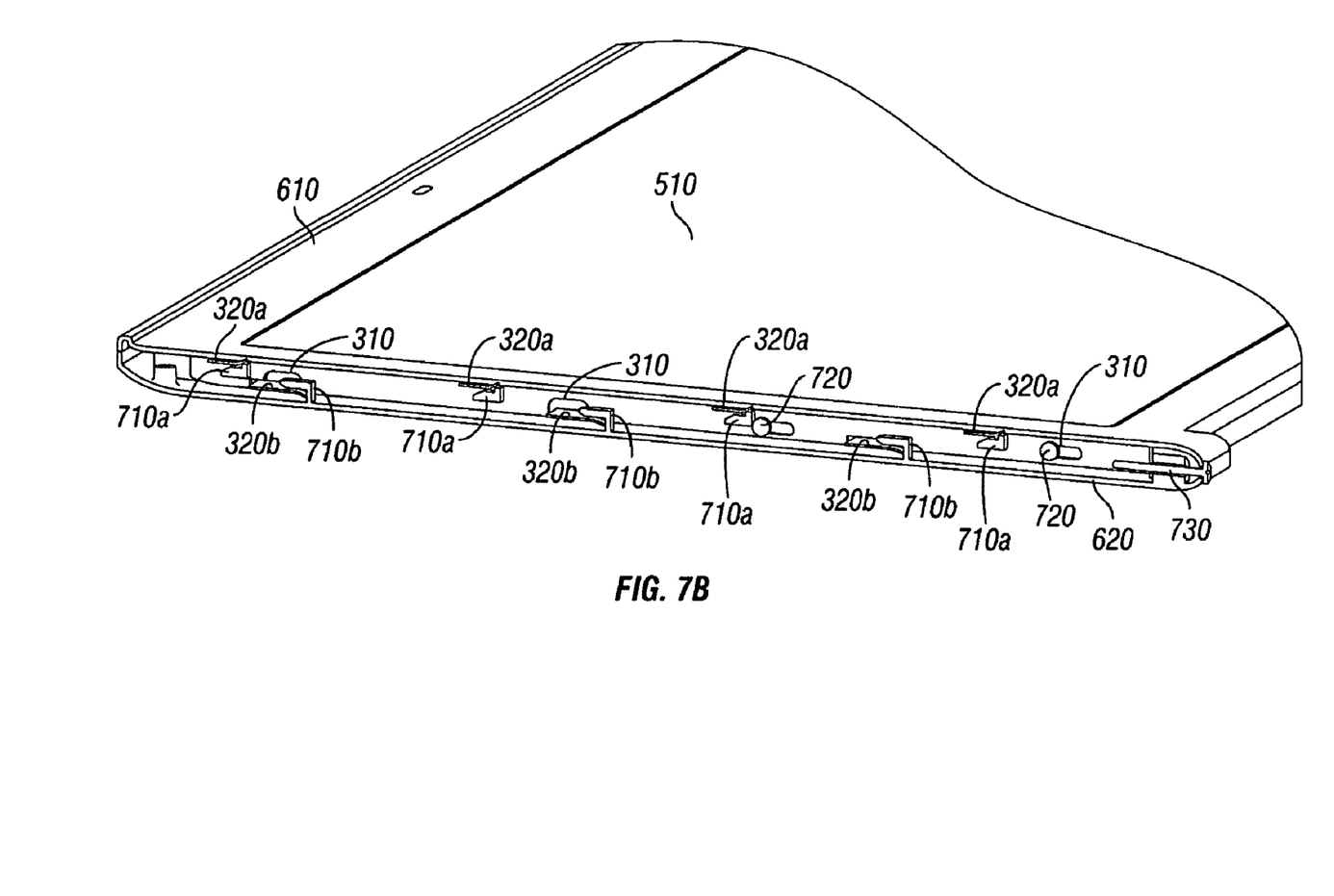
FIG. 7B represents a cut away view of an illustrative implementation an assembled display.

FIG. 7B represents a cut away view of an illustrative implementation of an assembled display. After a housing fastener 730 has been actuated, assembly of a display assembly 700 is complete. Actuation of a housing fastener 730 may cause bracket 200 to slide on the slot fasteners 520 into a secured position or one that not longer allows the bracket 300 to slide horizontally along the viewing plane of the display 510. Also, as discussed previously, it may cause guides 320*a*, 320*b* to engage with receiving portions 710*a*, 710*b*. Guides 320*a*, 320*b* may engage receiving portions 710*a*, 710*b* by sliding into an area defined by receiving portions 710*a*, 710*b*. When guides 320*a*, 320*b* are in the position shown in FIG. 7B, a bezel 610 and back cover 620 may be firmly or tightly secured to a display 510 and bracket 300. A bottom edge of guide 320*a* may be firmly pressed against a bottom part of a receiving portion 710*a*, and a top edge of guide 320*b* may be firmly pressed against a top part of receiving portion 710*b*. As a result, a bezel 610 and back cover 620 may both be firmly secured against a display 510 allowing little to no movement of the bezel 610 and back cover 620 from the display 510. Once a display assembly 700 is fully assembled, each component of the display assembly may be firmly secured to each other preventing unwanted separation of the components and/or damage to the components. Further, the display assembly may maintain high serviceability because it can be quickly and easily disassembled to service, repair, or replace parts.

The methods and implementations discussed may provide for the assembly of a display housing with a reduced number of fasteners, while allowing the display housing to still be serviceable. By decreasing the number of fasteners used, potential damage to a display may be reduced and assembly time and cost may be reduced. Additionally, the assembled display housing may also be more aesthetically pleasing because fasteners and fastener holes or the like have nearly been eliminated on the bezel and back cover.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method for assembling a display for an information handling system (IHS), the method comprising:
    providing a bracket on a display, wherein the bracket comprises at least two guides;
    positioning the display in proximity to a back cover, wherein a first guide is aligned with a first receiving portion of the back cover;
    positioning a front cover in proximity to the display, wherein a second receiving portion of the front cover is aligned with a second guide; and
    actuating a first fastener, wherein the first fastener causes the first guide to engage the first receiving portion and the second guide to engage the second receiving portion.

2. The method of claim 1, wherein the first guide is shaped in a manner that causes the display to slide against the back cover when the first guide slides into the first receiving portion.

3. The method of claim 1, wherein the second guide is shaped in a manner that causes the front cover to slide against the display when the second guide slides into the second receiving portion.

4. The method of claim 1, wherein bracket further comprises a slot through which a second fastener attaches the bracket to the display.

5. The method of claim 4, wherein the slot allows the bracket to slide back and forth along a viewing plane of the display when the bracket is attached to the display by the second fastener.

6. The method of claim 5, wherein the back cover and the front cover are in a secured position relative to the display when the first fastener is actuated.

7. The method of claim 6, wherein the bracket further comprises a tab, and the first fastener secures in an opening of the tab when the first fastener is actuated, thereby locking the bracket into a position that does not allow the bracket to slide back and forth along a viewing plane of the display.

8. An information handling system (IHS) comprising:
- a bracket defining a slot, wherein a first fastener attaches the bracket to a display through the slot, and the bracket comprises:
  - a first set of guides, wherein the first set of guides engage a first set of receiving portions of a back cover;
  - a second set of guides, wherein the second set of guides engages a second set of receiving portions of a front cover; and
  - wherein the first set of guides are shaped in a manner that causes the display to slide against the back cover when the first set of guides engage the first set of receiving portions, and the second set of guides is shaped in a manner that causes the front cover to slide against the display when the second set of guides engage the second receiving portions.

9. The system of claim 8, wherein the first set of guides and the second set of guides each comprise one or more guides, and the first set of receiving portions and the second set of receiving portions each comprise one or more receiving portions.

10. The system of claim 8, wherein the slot allows the bracket to slide back and forth along a viewing plane of the display when the bracket is attached to the display by the first fastener.

11. The system of claim 10, further comprising:
- a second fastener, wherein the second fastener causes the first set of guides to slide into the first set of receiving portions and the second set of guides to slide into the second set of receiving portions.

12. The system of claim 11, wherein the back cover and the front cover are in a secured position relative to the display when the second fastener is actuated.

13. The system of claim 11, wherein the bracket further comprises a tab, and the second fastener secures in an opening of the tab when the second fastener is actuated, thereby locking the bracket into a position that does not allow the bracket to slide back and forth along a viewing plane of the display.

14. An information handling system (IHS) comprising:
- a display;
- a bracket defining a slot and comprising a first guide and a second guide, wherein a first fastener attaches the bracket to the display through the slot;
- a back cover, wherein a first receiving portion of the back cover engages the first guide;
- a front cover, wherein a second receiving portion of the front cover engages the second guide; and
- a second fastener, wherein the second fastener causes the first guide to slide into the first receiving portion and the second guide to slide into the second receiving portion.

15. The system of claim 14, wherein the first guide is shaped in a manner that causes the display to slide against the back cover when the second fastener is actuated.

16. The system of claim 14, wherein the second guide is shaped in a manner that causes the front cover to slide against the display when the second fastener is actuated.

17. The system of claim 14, wherein the slot allows the bracket to slide back and forth along a viewing plane of the display when the bracket is attached to the display by the first fastener.

18. The system of claim 14, wherein the back cover and the front cover are in a secured position relative to the display when the second fastener is actuated.

19. The system of claim 18, wherein the bracket further comprises a tab, and the second fastener secures in an opening of the tab when the second fastener is actuated, thereby locking the bracket into a position that does not allow the bracket to slide back and forth along a viewing plane of the display.

* * * * *